United States Patent
Cui et al.

(10) Patent No.: US 11,763,080 B1
(45) Date of Patent: Sep. 19, 2023

(54) BOOSTED LATENT DIRICHLET ALLOCATION WITH PREDEFINED TOPIC CLUSTERS AND REPELLING FORCE

(71) Applicant: INTUIT INC., Mountain View, CA (US)

(72) Inventors: Wendi Cui, Mountain View, CA (US); Colin P. Ryan, Mountain View, CA (US); Damien J. Lopez, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/184,469

(22) Filed: Mar. 15, 2023

(51) Int. Cl.
*G06F 40/279* (2020.01)
*G06N 5/022* (2023.01)

(52) U.S. Cl.
CPC .......... *G06F 40/279* (2020.01); *G06N 5/022* (2013.01)

(58) Field of Classification Search
CPC .............................. G06F 40/279; G06N 5/022
USPC ............................................................ 704/9
See application file for complete search history.

(56) References Cited

U.S. PATENT DOCUMENTS

2019/0205322 A1* 7/2019 Dobrynin .............. G06F 16/355

OTHER PUBLICATIONS

Jagarlamudi, "Incorporating Lexical Priors into Topic Models", Proceedings of the 13th Coinference of the European Chapter of the Association for Computational Linguistics, Apr. 23-27, 2012, pp. 204-213.
Seth, "Part 2: Topic Modeling and Latent Dirichlet Allocation (LDA) using Gensim and Sklearn", Analytics Vidhya,Data Science Blogathon, Jun. 28, 2021, 9 pages.
Singh, "How we Changed Unsupervised LDA to Semi-Supervised Guided LDA", https://www.freecodecamp.org/news/how-we-changed-unsupervised-lda-to-semi-supervised-guidelda-e36a95f3a164/, Oct. 24, 2022, 13 pages.

* cited by examiner

*Primary Examiner* — Thierry L Pham
(74) *Attorney, Agent, or Firm* — DLA PIPER LLP (US)

(57) ABSTRACT

Systems and methods for a boosted Latent Dirichlet Allocation model with predefined clusters and repelling force. Herein, clusters are pre-populated with seed words with amplified weights to predefine the characteristics of clusters. A repel force is also applied while assigning words to specific clusters in order to assign words more accurately to clusters in instances where clusters have similar characteristics. In addition to generating improved clustering of words, systems and methods may analyze words within queries to provide explainability output related to the performance of content or data.

20 Claims, 4 Drawing Sheets

BOOSTED LATENT DIRICHLET ALLOCATION WITH PREDEFINED TOPIC CLUSTERS AND REPELLING FORCE

BACKGROUND

Topic modeling is a computational method used to automatically identify topics or themes within a collection of documents. It is a way to discover hidden patterns of meaning in large collections of text, without having to read each individual document.

The basic idea behind topic modeling is to identify words that tend to occur together in a particular context, and then group those words into topics. Topics can be thought of as a set of related words that tend to co-occur in documents, and that represent a specific theme or concept. Each document in the collection is then represented as a mixture of these topics, and within the model, mixture coefficients are used to represent the proportion of each topic in the document.

Conventionally, the most commonly used algorithm for topic modeling is Latent Dirichlet Allocation (LDA), which is a probabilistic model that assumes that each document is a mixture of a small number of latent topics, and that each word in the document is generated from one of these topics. However, while topic modeling algorithms such as LDA are useful for extracting underlying themes or topics from large collections of text, there are known drawbacks.

For example, one major challenge with conventional LDA is determining the number of topics that should be extracted from a given text. Here, choosing too few topics may result in loss of valuable information, while choosing too many topics may result in overlapping or redundant topics. Further, while LDA can identify topics within a text corpus, interpreting those topics and assigning meaningful labels to them can be difficult. This is especially true when topics are highly abstract or multidimensional. In addition, LDA is a bag-of-words model, meaning it treats each document as a collection of individual words and ignores their order and context. This can make it difficult to capture nuances of meaning, sentiment, or sarcasm, which can be important in certain types of text analysis.

Accordingly, there is a need for systems and methods that address the deficiencies of the aforementioned conventional approaches.

SUMMARY

The implementation of conventional LDA typically involves: 1. choosing the number of topics and the Dirichlet parameters (i.e., alpha $\alpha$ and beta $\beta$); 2. randomly assigning topics to words for each document in a corpus; 3. computing the probability of a specific word belonging to each topic, given the current topic assignments of all the other words in the document, and given the topic assignment of the specific word in other documents; 4. reassigning the word to a new topic based on these probabilities; and 5. updating topic distributions after all the words in all the documents have been assigned topics. However, as discussed above, conventional LDA has known limitations and deficiencies.

The instant systems and methods provide improvements and solutions to the known limitations and deficiencies discussed above. For example, in addition to the LDA steps outlined above, the instant systems and methods pre-populate a pre-defined set of clusters with seed words to define what topics the set of clusters should be composed of. In another respect, during training, instead of relying on similarity factors acting as an attractive force to decide which cluster a word should be clustered into, or in addition to using similarity factors, the instant systems and methods implement a repelling force to strengthen which cluster a word should avoid. Such techniques can enable a boosted LDA to cluster words more accurately, especially in instances where clusters appear to be associated with similar topics. In addition, such techniques can enable a system to classify a user query or document into pre-defined classifications representing different user intentions. Once classified, the system can then identify which classification is underperforming and generate explainability output for a relevant content team.

DETAILED DESCRIPTION OF SEVERAL EMBODIMENTS

Figure 1:
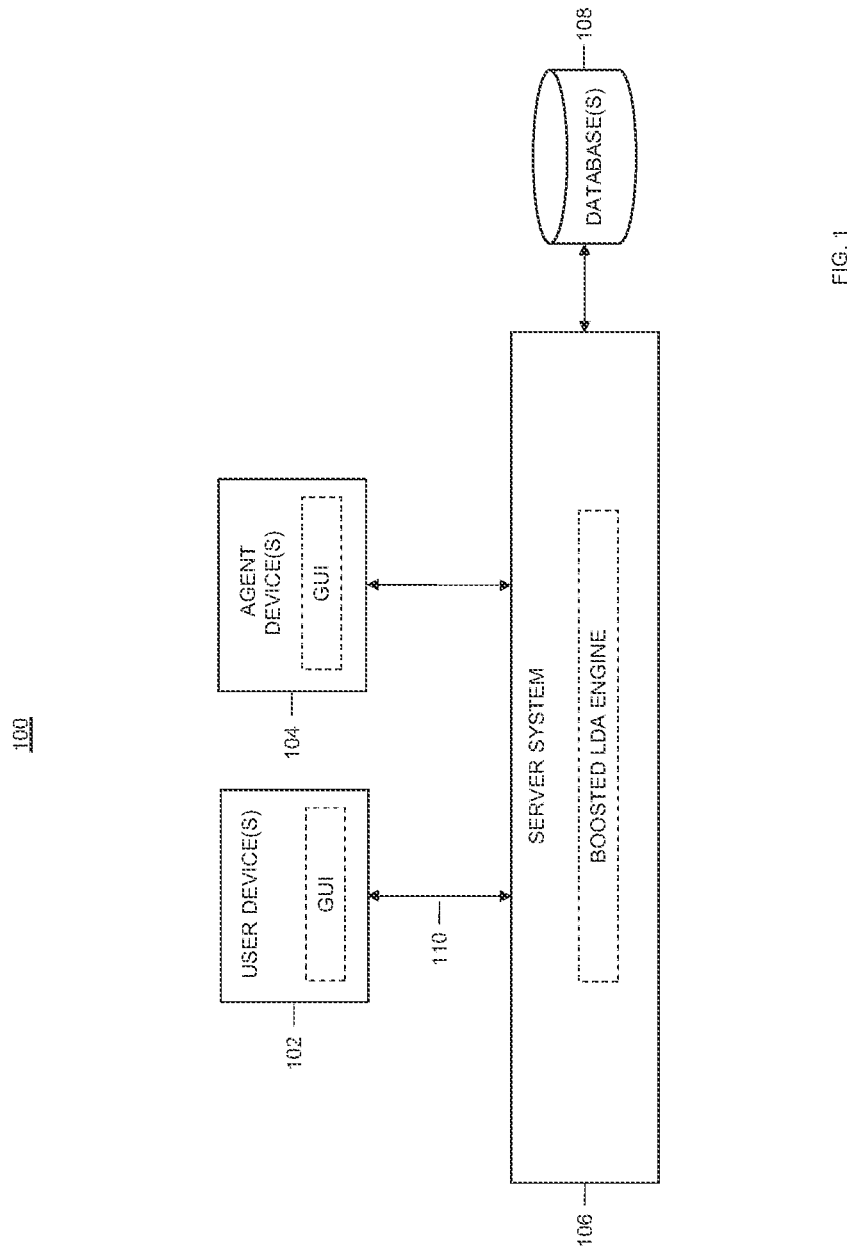
FIG. 1 shows an example system configured to implement a Latent Dirichlet Allocation model with predefined clusters and repelling force according to an embodiment of the present disclosure.

Referring to FIG. 1, computing environment 100 can be configured to implement a boosted Latent Dirichlet Allocation model automatically and intelligently with predefined clusters and repelling force, according to embodiments of the present disclosure. Computing environment 100 may include one or more user device(s) 102, a server system 106, one or more database(s) 108, and/or one or more agent device(s) 104, communicatively coupled to the server system 106. The user device(s) 102, one or more agent device(s) 104, server system 106, and database(s) 108 may be configured to communicate through network 110.

In one or more embodiments, user device(s) 102 is operated by a user. User device(s) 102 may be representative of a mobile device, a tablet, a desktop computer, or any computing system having the capabilities described herein. Users may include, but are not limited to, individuals such as, individuals, employees, companies, prospective clients, and/or customers of an entity associated with server system 106, such as individuals who are utilizing the services of, or consultation from, an entity associated with that document and server system 106.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, a user device(s) 102 includes a non-transitory memory, one or more processors including machine readable instructions, a communications interface which may be used to communicate with the server system (and, in some examples, with the database(s) 108), a user input interface for inputting data and/or information to the user device and/or a user display interface for presenting data and/or information on the user device. In some embodiments, the user input interface and the user display interface are configured as an interactive graphical user interface (GUI). The user device(s) 102 are also configured to provide the server system 106, via the interactive GUI, input information such a user actions (e.g., queries, text, and/or documents) for further processing. In some embodiments, the interactive GUI is hosted by the server system 106 or provided via a client application operating on the user device. In some embodiments, a user operating the user device(s) 102 may query server system 106 for information related to a service provided by an entity hosting server system 106.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 include, but are not limited to, individuals such as, for example, software engineers, database administrators, employees, and/or customer service agents, of an entity associated with server system 106.

Agent device(s) 104 according to the present disclosure include, without limit, any combination of mobile phones, smart phones, tablet computers, laptop computers, desktop computers, server computers or any other computing device configured to capture, receive, store and/or disseminate any suitable data. In one embodiment, each agent device(s) 104 includes a non-transitory memory, one or more processors including machine readable instructions, a communications interface that may be used to communicate with the server system (and, in some examples, with database(s) 108), a user input interface for inputting data and/or information to the user device and/or a user display interface for presenting data and/or information on the user device. In some examples, the user input interface and the user display interface are configured as an interactive GUI. The agent device(s) 104 are also configured to provide the server system 106, via the interactive GUI, input information (e.g., queries) for further processing. In some examples, the interactive GUI may be hosted by the server system 106 or it may be provided via a client application operating on the user device.

The server system 106 includes one or more processors, servers, databases, communication/traffic routers, non-transitory memory, modules, and interface components. In one or more embodiments, server system 106 hosts, stores, and operates a boosted LDA model with predefined clusters and repelling force. Server system 106 may be configured to aggregate seed words for one or more clusters. Server system 106 may further be configured to pre-populate the one or more clusters with the seed words by inputting the seed words into LDA model with predefined clusters and repelling force to define the one or more clusters by the seed words that are assigned. Server system 106 may be further configured to train the boosted LDA model with predefined clusters and repelling force. Training may include receiving a corpus of documents; randomly assigning the one or more clusters to each word in the corpus; for each word in the corpus, calculating a first probability of assigning the word to a cluster of the one or more clusters by determining a second probability that a given word is assigned to the same cluster across all documents of the corpus, a third probability that, for the given word, all other words within a document are assigned to the same cluster, and a repel force associated with the given word, if the given word is a seed word by at least determining a number of other seed words in the cluster that do not belong to the cluster; and drawing a new cluster based on the first probability. Clusters are collections (or data groups) of words, documents, strings, or text, with similar characteristics and/or associated with similar topics. In one instance, a cluster may be associated with content, data, maintained by an entity associated with server system 106 and/or an individual or team (e.g., engineer operated agent device(s) 104) and further associated with server system 106.

Moreover, the server system 106 may include security components capable of monitoring user rights and privileges associated with initiating API requests for accessing the server system 106 and modifying data in database(s) 108. Accordingly, the server system 106 may be configured to manage user rights, manage access permissions, manage object permissions, and/or the like. The server system 106 may be further configured to implement two-factor authentication, secure sockets layer (SSL) protocols for encrypted communication sessions, biometric authentication, token-based authentication, and/or the like.

Database(s) 108 may be locally managed, and/or may be a cloud-based collection of organized data stored across one or more storage devices. Database(s) 108 may be complex and developed using one or more design schema and modeling techniques. Database(s) 108 may be hosted at one or more data centers operated by a cloud computing service provider. Database(s) 108 may be geographically proximal to or remote from the server system 106 and is configured for data dictionary management, data storage management, multi-user access control, data integrity, backup and recovery management, database access language application programming interface (API) management, and/or the like. Database(s) 108 is in communication with server system 106, end user device(s) 102, and agent device(s) 104, via network 110. Database(s) 108 stores various data, including training data (e.g., a corpus of queries, documents, and/or text) that can be modified and leveraged by server system 106 and agent device(s) 104. Various data in the database(s) 108 will be refined over time using a LDA model with predefined clusters and repelling force discussed with respect to FIGS. 2-3. Additionally, database(s) 108 may be deployed and maintained automatically by one or more components shown in FIG. 1.

Network 110 may be of any suitable type, including individual connections via the Internet, cellular or Wi-Fi networks. In some embodiments, network 110 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
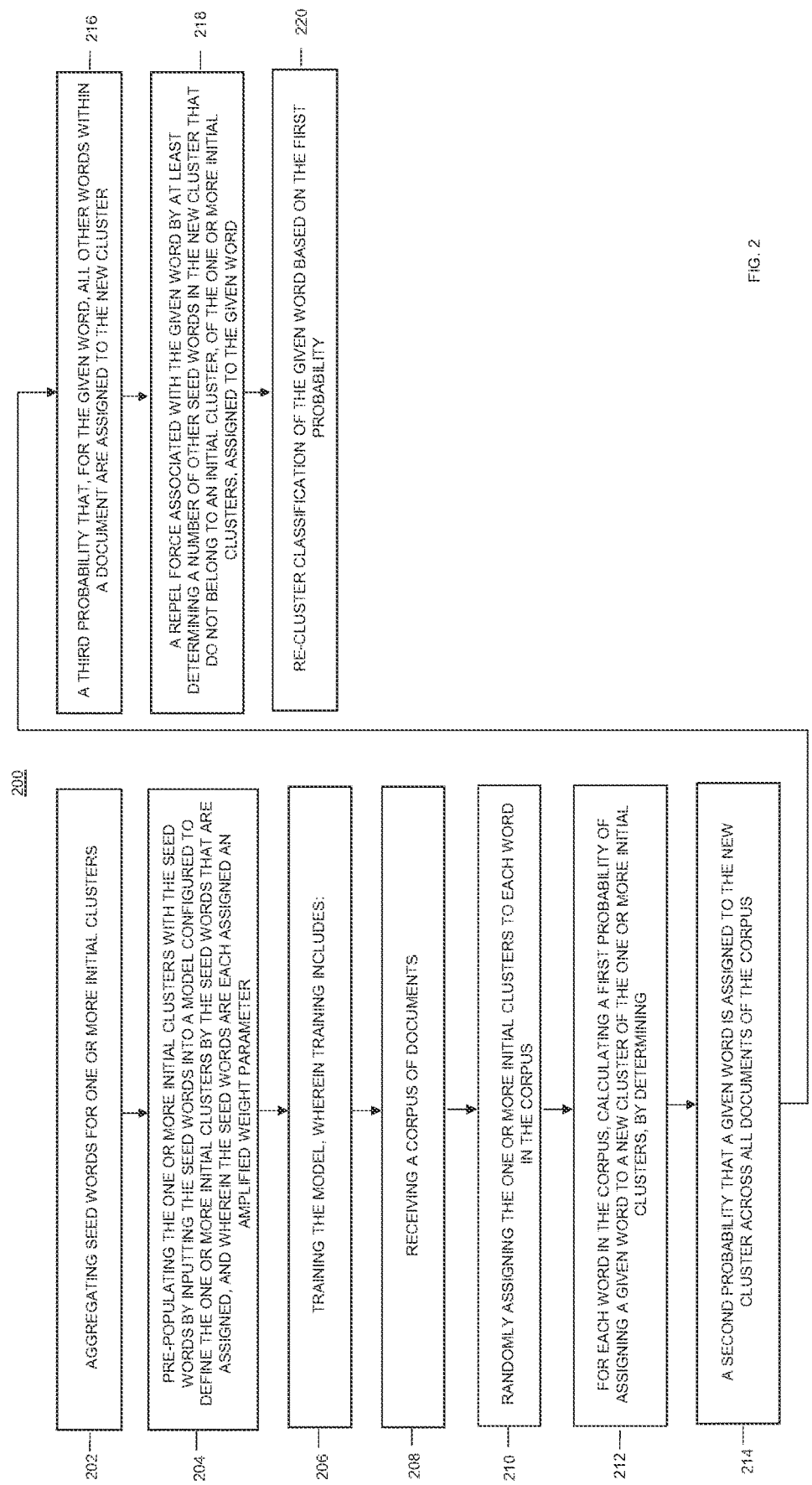
FIG. 2 shows a Latent Dirichlet Allocation model with predefined clusters and repelling force training process according to an embodiment of the present disclosure.

FIG. 2 shows a boosted Latent Dirichlet Allocation (LDA) model with predefined clusters and repelling force training process 200 according to an embodiment of the present disclosure. The entire computing environment 100 may work together to perform process 200 in a distributed manner. At 202, server system 106 may implement instructions to aggregate seed words for one or more clusters. Here, server system 106 may receive several seed words from agent device(s) 104 and/or pull seed words from one or more sources. Server system 106 may additionally define the number of clusters that words can be classified to. For example, server system 106 may receive instructions from agent device(s) 104 to create 13 clusters (although any number of clusters may be defined).

At 204, server system 106 may generate instructions to pre-populate the one or more clusters with the seed words, amplified by a weight parameter, by inputting the seed words into the LDA model with predefined clusters and repelling force, wherein the LDA model is thereby configured to define the one or more clusters based on the seed words that are assigned them.

TABLE 1

| CLUSTER | SEED WORD 1 | SEED WORD 2 | SEED WORD 3 | SEED WORD 4 |
|---|---|---|---|---|
| Benefits | 100 * Espp | 100 * Stock | Time off | Sick leave |
| Developer | Paved road | Msaas | kubernetes | |
| Technology | Pingid | Self-service | | |

As depicted in the example of Table 1, the clusters: benefits, developer, and technology are pre-populated with seed words. For example, the benefits cluster is pre-populated with seed words espp, stock, time off, and sick leave. Here, espp is amplified by a weight parameter of 100. Assigning seed words and applying a weight parameter to the seed words teaches the boosted LDA model with predefined clusters and repelling force what each cluster should look (i.e., defines each cluster).

At 206, server system 106 may train the boosted LDA model with predefined clusters and repelling force. Training may include receiving a corpus of documents 208. For example, the corpus of documents may be training data including several documents and/or queries meant teach and test the accuracy of the boosted LDA model with predefined clusters and repelling force. Training may further include randomly assigning the one or more clusters to each word in the corpus 210. Here, server system 106 may parse through each word or string of document or query and automatically assign the word or string to a cluster.

At 212, Server system 106 may then, for each word in the corpus, calculate a first probability of assigning the word to a cluster of the one or more clusters by determining a second probability that a given word is assigned to the same cluster across all documents of the corpus 214. For example, for each document in the corpus, server system 106 may determine for each word a (second) probability that the word is assigned to the same cluster in every document in the corpus. Further, server system 106 may determine a third probability that, for the given word, all other words within a document are assigned to the same cluster 216. For example, for a given word, server system 106 may determine a (third) probability that all the other words in the specific document are assigned to the same cluster as the given word.

At 218, in furtherance of training the boosted LDA model with predefined clusters and repelling force, server system 106 may determine, if the given word is a seed word, a repel force by at least determining a number of other seed words in the cluster that belong to a different cluster than the cluster assigned to the given word.

TABLE 2

| | What are the seed words in the Benefits cluster? | How many of these seeds words in Benefits cluster do not belong to the same cluster as espp: |
|---|---|---|
| R ("Espp", "benefits") | | |
| Answer/Output | espp, stock, time off, sick leave | 0 |
| R ("espp", "developer") | What are the seed words in the Developer cluster? | How many of these seeds words in the Developer cluster do not belong to the same cluster as espp: |
| Answer/Output | paved road, msaas, kubernetes | 3 |
| R(non-seedwords) | What are the seed words associated with non-seed word | How many of these seeds words in the particular cluster do not belong to the same cluster as espp: |
| Answer/Output | Not Applicable | 0 |

As depicted in the example of Table 2, a repel force of a seed word (i.e., espp) and a non-seed word is determined. The repel force of espp relative to the Benefits cluster is 0, since the other seed words, besides espp, are known to be seed words associated with the benefits cluster. In contrast, the repel force of espp relative to the Developer cluster is 3, since the other seed words, besides espp, belong to a cluster different than the one associated with espp (i.e., the Benefits cluster). In further contrast still, a repel force is not determined for non-seed words and therefore the repel force for the non-seed word is 0.

At 220, server system 106 may reclassify the given word based on the first probability. Here the server system 106 may adjust probabilities that the given word is associated more with one cluster over another, assign the given word to a different cluster, and/or create a new cluster and assign the given word to the new cluster so that the given word is assigned to a cluster that best reflects what the given word should be associated with. Server system 106 may determine the probability re-classifying a given word using the following equation:

$$P(\text{``word''}, \text{``cluster''}) = [\text{Count}(\text{`word'}, \text{`cluster'}) + a] * [\text{Count}(\text{`other words in the same document'}, \text{`cluster'}) + b] / [R(\text{``word''}, \text{``cluster''}) + c]$$

As depicted in the equation above, P( ) is the probability, word is the given word being analyzed, cluster is the cluster being analyzed, a, b, and c are numerical weights (e.g., 0.5, 1, 3) that can be applied. Notably, the weights applied to a, b, and c, can be used to improve the performance of the boosted LDA model with predefined clusters and repelling force model. In one example, the probability of re-classing a word (i.e., espp) that is originally classified to a Technology cluster into one of three clusters (i.e., Benefits, Developer, Technology) using the above algorithm is as follows:

TABLE 3

Original classification:

"Espp": 'Technology'
Implementation of re-classification algorithm:

P ("espp", "developer") = [Count('espp', 'developer') + a] *
[Count('other words in the same article', 'developer') +
b]/[ R ("espp", "developer") + c]
Output re-classification:

P("espp", "developer") = 0.1
P("espp", "benefits") = 0.8
P("espp", 'technology') = 0.1

As depicted in the equation above in Table 3 and in view of the data in Table 1 and Table 2, in furtherance of implementing a re-clustering algorithm to evaluate the word espp, the output of the re-classifying algorithm is that it has 0.8 probability of espp being classified in the Benefits cluster and a 0.1 probability of being assigned to the developer cluster. In some embodiments, 206-220 may be repeated according to a predefined schedule or according to set parameters.

Figure 3:
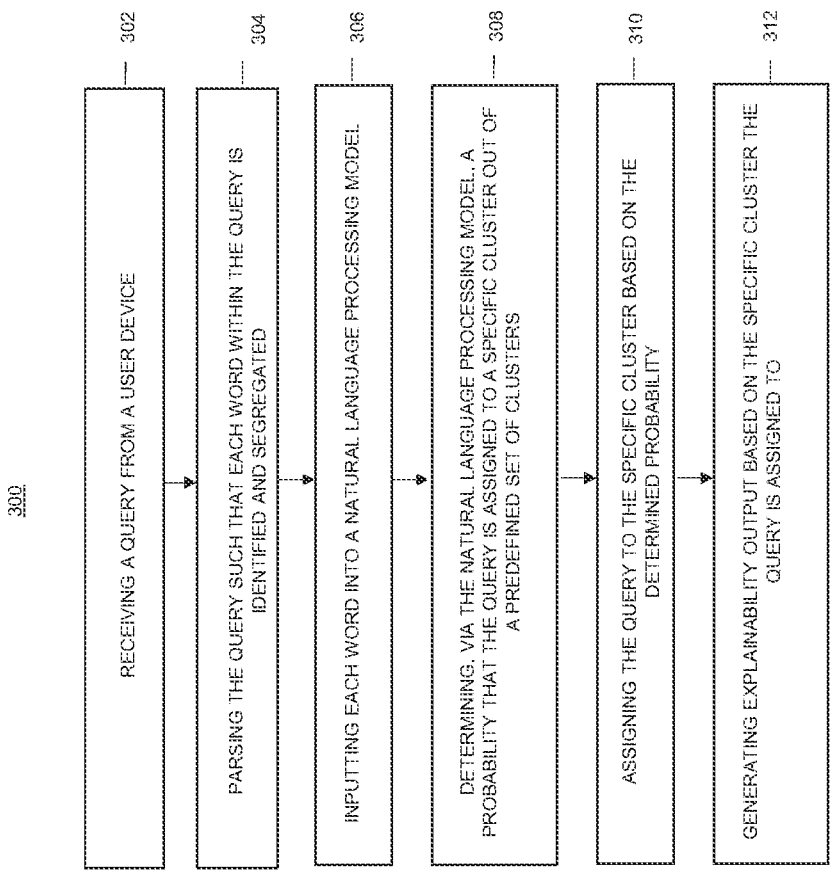
FIG. 3 shows a process for classifying a query using a Latent Dirichlet Allocation model with predefined clusters and repelling force according to an embodiment of the present disclosure.

FIG. 3 shows a process 300 for classifying a query using a boosted Latent Dirichlet Allocation (LDA) model with predefined clusters and repelling force according to an embodiment of the present disclosure. At 302, server system 106 may receive a query from user device(s) 102 or agent device(s) 104, wherein the query may be either internally generated or externally generated. For example, the query could be related to a request for additional information or for content from data hosted/maintained by an entity associated with server system 106.

At 304, server system 106 may parse the query such that each word or string in the query is identified and segregated. The parsed word(s) or string(s) may then be inputted into a natural language model at 306. For example, server system 106 may feed the parsed word(s) or string(s) as input to a boosted LDA model with predefined clusters and repelling force.

At 308, the server system 106 may then determine a probability that the query is assigned to a specific cluster out of a predefined set of clusters. For example, as discussed in relation to FIG. 2, 208-218, server system 106 may randomly assign the one or more clusters to each word or string identified when the query was parsed at 304. For each word or string in the query, server system 106 may then calculate a first probability of assigning the word or string to a cluster of the set of predefined cluster by determining: (1) a second probability that a given word or string is assigned to the same cluster across all documents (e.g., previously analyzed queries, training data, and the like) of the corpus associated with the boosted LDA model with predefined clusters and repelling force; (2) a third probability that, for the given word or string, all the words within a document are assigned to the same cluster; and (3) a repel force associated with the given word or string, if the given a word is a seed word, by at least determining a number of other seed words in the cluster that belong to a different cluster than the cluster assigned to the given word or string.

At 310, the query may be assigned to a specific cluster based on the determined first probability. For example, in response to the processing implemented at 308, server system 106 may then implement a similar algorithm as discussed in relation to 220, to assign the query to a specific cluster of the predetermined clusters.

At 312, server system 106 may generate explainability output based on the specific cluster the query is assigned to. For example, server system 106 may generate human interpretable output indicating the cluster that the query was assigned to, to inform an individual or team (e.g., engineers) that a query was generated related to content or data that they manage. The explainability output may further inform the individual or team whether the content or data that they manage is performing or underperforming.

Figure 4:
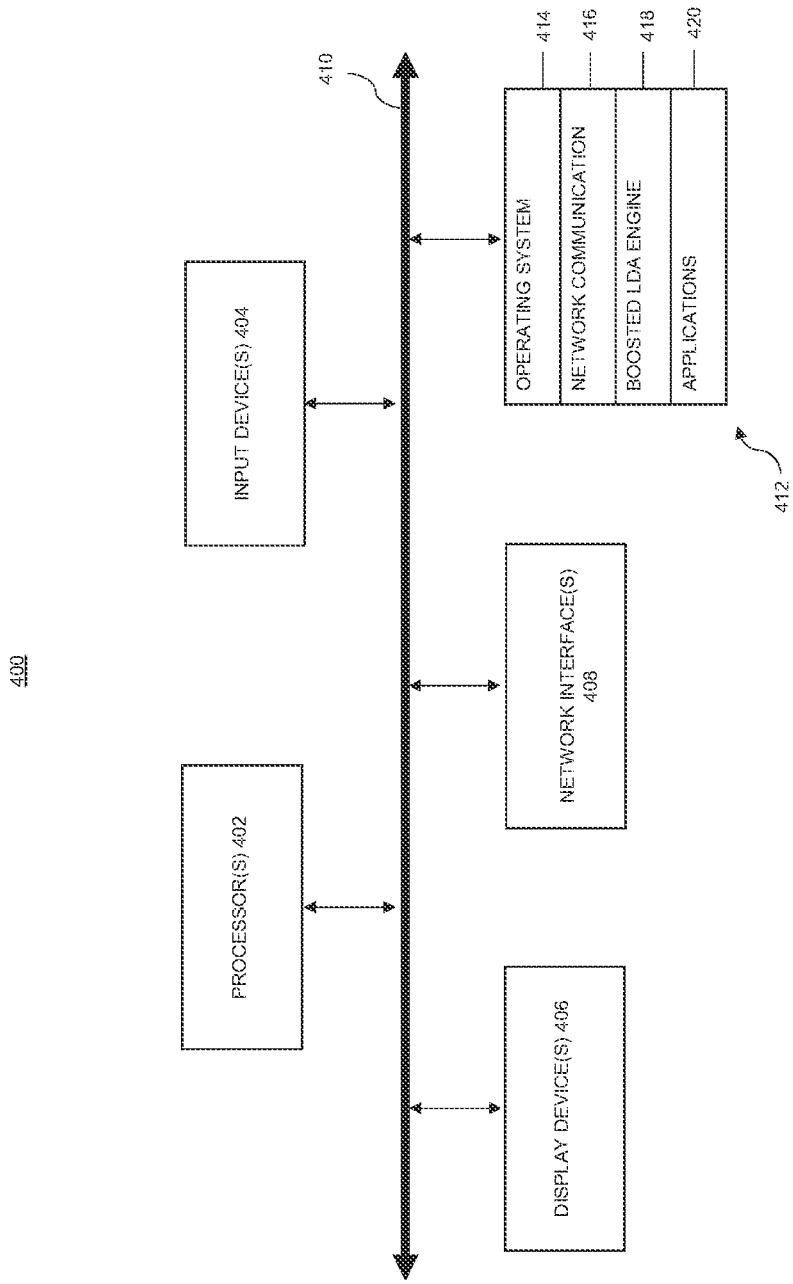
FIG. 4 shows an example computing device according to an embodiment of the present disclosure.

FIG. 4 is a block diagram of an example computing device 400 that may implement various features and processes as described herein. For example, in some embodiments the computing device 400 may function as the user device(s) 102, agent device(s) 104, and/or server system 106 or a portion of any of these elements. The computing device 400 may be implemented on any electronic device that runs software applications derived from instructions, including without limitation personal computers, servers, smart phones, media players, electronic tablets, game consoles, email devices, etc. In some implementations, the computing device 400 may include processor(s) 402, one or more input device 404, one or more display device 406, one or more network interfaces 408, and one or more computer-readable medium 412. Each of these components may be coupled by a bus 410.

The display device 406 may be any known display technology, including but not limited to display devices using Liquid Crystal Display (LCD) or Light Emitting Diode (LED) technology. The processor(s) 402 may use any known processor technology, including but not limited to graphics processors and multi-core processors. The input device 404 may be any known input device technology, including but not limited to a keyboard (including a virtual keyboard), mouse, track ball, and touch-sensitive pad or display. The bus 410 may be any known internal or external bus technology, including but not limited to ISA, EISA, PCI, PCI Express, USB, Serial ATA or FireWire. The computer-readable medium 412 may be any non-transitory medium that participates in providing instructions to the processor(s) 402 for execution, including without limitation, non-volatile storage media (e.g., optical disks, magnetic disks, flash drives, etc.), or volatile media (e.g., SDRAM, ROM, etc.).

The computer-readable medium 412 may include various instructions for implementing an operating system 414 (e.g., Mac OS®, Windows®, Linux). The operating system may be multi-user, multiprocessing, multitasking, multithreading, real-time, and the like. The operating system may perform basic tasks, including but not limited to: recognizing input from the input device 404; sending output to the display device 406; keeping track of files and directories on the computer-readable medium 412; controlling peripheral devices (e.g., disk drives, printers, etc.) which can be controlled directly or through an I/O controller; and managing traffic on the bus 410. The network communications instructions 416 may establish and maintain network connections (e.g., software for implementing communication protocols, such as TCP/IP, HTTP, Ethernet, telephony, etc.).

The Boosted LDA engine 418 may include instructions that enable computing device 400 to implement one or more methods as described herein. Applications 420 may be an application that uses or implements the processes described herein and/or other processes. The processes may also be implemented in the operating system 414. For example, applications 420 and/or operating system 414 may execute one or more operations to implement an LDA model with predefined clusters and repelling force.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, python, and the like), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system comprising:
   at least one processor; and
   at least one non-transitory computer readable medium storing instructions that, when executed by the at least one processor, cause the at least one processor to perform processing comprising:
   aggregating seed words for one or more initial clusters;
   pre-populating the one or more initial clusters with the seed words by inputting the seed words into a model configured to define the one or more initial clusters by the seed words that are assigned, and wherein the seed words are each assigned an amplified weight parameter; and
   training the model, wherein training includes:
      receiving a corpus of documents;
      randomly assigning the one or more initial clusters to each word in the corpus;
      for each word in the corpus, calculating a first probability of assigning a given word to a new cluster of the one or more initial clusters, by determining:
         a second probability that the given word is assigned to the new cluster across all documents of the corpus;

a third probability that, for the given word, all other words within a document are assigned to the new cluster; and a repel force associated with the given word by at least determining a number of other seed words in the new cluster that do not belong to an initial cluster, of the one or more initial clusters, assigned to the given word; and reclassifying the given word based on the first probability.

2. The system of claim 1, wherein the model is a Latent Dirichlet Allocation model.

3. The system of claim 1, wherein pre-populating the one or more initial clusters further includes determining a number of predefined clusters in the one or more initial clusters.

4. The system of claim 1, further comprising generating explainability output in response to reclassifying the given word based on the first probability.

5. The system of claim 1, wherein the repel force is determined for the given word upon determining that the given word is a seed word.

6. The system of claim 1, wherein the repel force equates to zero for the given word that is not a seed word.

7. The system of claim 1, wherein reclassifying the given word includes creating a first new cluster to assign the given word to.

8. The system of claim 1, wherein reclassifying the given word further comprises assigning weights to variables to improve performance of the model.

9. A computer-implemented method comprising:
   aggregating, by at least one processor, seed words for one or more initial clusters;
   pre-populating, by the at least one processor, the one or more initial clusters with the seed words by inputting the seed words into a model configured to define the one or more initial clusters by the seed words that are assigned, and wherein the seed words are each assigned an amplified weight parameter; and
   training, by the at least one processor, the model, wherein training includes:
      receiving a corpus of documents;
      randomly assigning the one or more initial clusters to each word in the corpus;
   for each word in the corpus, calculating a first probability of assigning a given word to a new cluster of the one or more initial clusters, by determining:
      a second probability that the given word is assigned to the new cluster across all documents of the corpus;
      a third probability that, for the given word, all other words within a document are assigned to the new cluster; and
      a repel force associated with the given word by at least determining a number of other seed words in the new cluster that do not belong to an initial cluster, of the one or more initial clusters, assigned to the given word; and
   reclassifying the given word based on the first probability.

10. The computer-implemented method of claim 9, wherein the model is a boosted Latent Dirichlet Allocation model.

11. The computer-implemented method of claim 9, wherein pre-populating the one or more initial clusters further includes determining a number of predefined clusters in the one or more initial clusters.

12. The computer-implemented method of claim 9, further comprising generating explainability output in response to reclassifying the given word based on the first probability.

13. The computer-implemented method of claim 9, wherein the repel force is determined for the given word upon determining that the given word is a seed word.

14. The computer-implemented method of claim 9, wherein the repel force equates to zero for the given word that is not a seed word.

15. The computer-implemented method of claim 9, wherein reclassifying the given word includes creating a first new cluster to assign the given word to.

16. The computer-implemented method of claim 9, wherein reclassifying the given word further comprises assigning weights to variables to improve performance of the model.

17. A system comprising:
   at least one processor; and
   at least one non-transitory computer readable medium storing instructions that, when executed by the at least one processor, cause the at least one processor to perform processing comprising:
      receiving a query from a user device;
      parsing the query such that each word within the query is identified and segregated;
      inputting each word into a natural language processing model;
      determining, via the natural language processing model, a probability that the query is assigned to a specific cluster out of a predefined set of clusters, the determining comprising determining a repel force associated with each word;
      assigning the query to the specific cluster based on the determined probability; and
      generating explainability output based on the specific cluster the query is assigned to.

18. The system of claim 17, wherein the natural language processing model is a boosted Latent Dirichlet Allocation model.

19. The system of claim 17, the processing further comprising determining, for each word in the query, a second probability that a given word is assigned to a cluster out of the predefined set of clusters.

20. The system of claim 17, the processing further comprising determining a third probability that, for a given word, all other words within a document are assigned to the same specific cluster.

* * * * *